United States Patent Office.

FRITZ BENDER, OF MÜHLHEIM, GERMANY, ASSIGNOR TO FARBWERK MÜHLHEIM, VORMALS A. LEONHARDT & CO., OF SAME PLACE.

BLUE DYE.

SPECIFICATION forming part of Letters Patent No. 606,436, dated June 28, 1898.

Application filed December 22, 1897. Serial No. 663,042. (Specimens.) Patented in England October 14, 1895, No. 19,253, and in France July 21, 1896, No. 258,853.

*To all whom it may concern:*

Be it known that I, FRITZ BENDER, chemist, doctor of philosophy, residing at Mühlheim-on-the-Main, Grand Duchy of Hessen, Germany, have invented new and useful Improvements in the Manufacture of Blue Dyes, of which the following is a specification, and for which patents have been obtained in France, No. 258,853, dated July 21, 1896, and in Great Britain, No. 19,253, dated October 14, 1895.

My invention relates to blue coloring-matters which can be fixed on unmordanted cotton and are derived from one molecular proportion of a tetrazo compound of paradiamins—such as, for example, benzidin, tolidin, diamidodiphenol-ether, or the like—and two molecular proportions of 1.8 amidonaphthol 3.5 disulfo-acid described in my application for United States patent, Serial No. 663,041, filed December 22, 1897, and prepared by sulfonating the known 1.8 amidonaphthol 3 monosulfo-acid and hereinafter termed "acid B."

In carrying out my invention practically I proceed, for instance, as follows: Tolidin is tetrazotized in the well-known manner, and the solution of the tetrazo compound is poured into a concentrated watery solution of two molecular proportions of the acid B, the solution being kept distinctly alkaline by carbonate of soda. After stirring during several hours the combination is finished, which can be tested by dissolving a sample in warm water. The obtained solution must give on paper a pure-blue color. The coloring-matter can be isolated by salting out in the heat.

The coloring-matter has the following characteristics: It forms a dark powder with metallic luster. It is soluble in water, giving a pure-blue solution. It is insoluble in spirit and soluble in concentrated sulfuric acid with a pure-blue color. It dyes unmordanted cotton a pure-blue shade.

The following alterations may be made in the above example without materially changing the result: The tetrazo compound is combined with only one molecular proportion of the acid B in an alkaline solution, and the obtained "intermediate product" is afterward brought into reaction with phenols of the naphthalene series. For instance, by employing beta-naphthol or alpha-naphthol 4 or 5 sulfo-acid or sulfo-acid of 1.8 amidonaphthol a dyestuff results which dyes unmordanted cotton also a pure-blue shade. Furthermore, diazotizable middle components may be employed in the process. For instance, by combining tetrazoditolyl with one molecular proportion of alpha-naphthylamin, diazotizing again, and finally combining with two molecular proportions of the acid B in an alkaline solution a dyestuff is obtained which equally dyes unmordanted cotton a pure-blue shade.

Now what I claim, and desire to secure by Letters Patent, is the following:

As a new article of manufacture the dyestuff having in case the tetrazo derivative of tolidin is employed, the formula

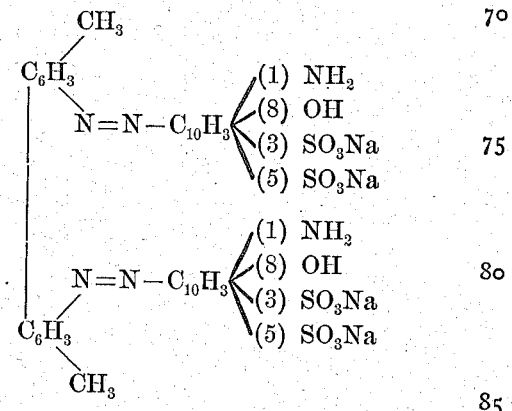

having the form of a dark powder with metallic luster, soluble in water giving a pure-blue solution, insoluble in spirit, soluble in concentrated sulfuric acid with a pure-blue color, and dyeing unmordanted cotton a pure-blue shade.

In testimony whereof I have signed my name to this specification in the presence of two subscribing witnesses.

FRITZ BENDER.

Witnesses:
RICHARD WIRTH,
EVA SATTLER.